United States Patent
Gossehelweg et al.

(10) Patent No.: US 9,024,533 B2
(45) Date of Patent: May 5, 2015

(54) CONTROLLING SWITCHING CURRENT REGULATORS

(71) Applicant: Atmel Corporation, San Jose, CA (US)

(72) Inventors: Juergen Gossehelweg, Radeberg (DE); Ingo Ruhm, Vierkirchen (DE)

(73) Assignee: Atmel Corporation, San Jose, CA (US)

(*) Notice: Subject to any disclaimer, the term of this patent is extended or adjusted under 35 U.S.C. 154(b) by 25 days.

(21) Appl. No.: 13/795,313

(22) Filed: Mar. 12, 2013

(65) Prior Publication Data

US 2014/0265929 A1 Sep. 18, 2014

(51) Int. Cl.
*H05B 37/02* (2006.01)
*G05F 1/10* (2006.01)
*H05B 33/08* (2006.01)

(52) U.S. Cl.
CPC .............. *G05F 1/10* (2013.01); *H05B 33/0815* (2013.01); *H05B 33/0851* (2013.01)

(58) Field of Classification Search
CPC ....... H05B 37/02; H05B 33/0845; G05F 1/10
USPC .......... 323/265, 282; 315/209 R, 227 R, 291, 315/307, 308, 360
See application file for complete search history.

(56) References Cited

U.S. PATENT DOCUMENTS

| 8,253,400 | B2* | 8/2012 | Irissou et al. | 323/282 |
| 8,288,953 | B1* | 10/2012 | Mei | 315/209 R |
| 8,476,843 | B2* | 7/2013 | Yu et al. | 315/294 |
| 8,487,546 | B2* | 7/2013 | Melanson | 315/291 |
| 8,564,219 | B2* | 10/2013 | Lee et al. | 315/291 |
| 8,581,508 | B2* | 11/2013 | Horino | 315/247 |

* cited by examiner

*Primary Examiner* — Thuy Vinh Tran
(74) *Attorney, Agent, or Firm* — Fish & Richardson P.C.

(57) ABSTRACT

A switching current regulator controls a load current flowing through a load. The switching current regulator switches a switch to an ON state after applying a regulating signal to the switch. During an integration period while the switch is in the ON state, the switching current regulator integrates an output voltage based on a sense voltage based on the load current and a reference voltage; at the end of the integration period, the switching current regulator outputs an integrated output voltage. The switching current regulator compares the integrated output voltage to a predetermined value. Based on a result of comparing the integrated output voltage and the predetermined value, the switching current regulator adjusts the regulating signal.

19 Claims, 5 Drawing Sheets

CONTROLLING SWITCHING CURRENT REGULATORS

TECHNICAL FIELD

This disclosure relates generally to electronics and more particularly to switching current regulators.

BACKGROUND

Switching current regulators are electronic devices that can manage a steady amount of current flowing through a load. A switching current regulator can switch the load on and off with a switching frequency and can control the load with a lower current or voltage than the load current or voltage. When a switching current regulator is coupled between a power supply and a load, the load is driven in high side mode; when a switching current regulator is coupled between a load and ground or a negative line, the load is driven in low side mode. pMOS (or PNP) transistors can be used for high side mode; while nMOS (or NPN) transistors can be used for low side mode.

Controlling switching current regulators can be useful in load driver systems such as light-emitting-device (LED) driver systems. For example, a switching current regulator can be used to control brightness of a LED by regulating a target current through the LED and flash the LED by switching on/off the LED at a high frequency. The switching current regulator can also be used to individually control current flowing through a plurality of LEDs and flash the LEDs sequentially at a high frequency. To measure the average current through LEDs, some systems use peak values of detected current, which reduces the accuracy of the measurement. In some other systems, a sense resistor is used and added into a load path, which changes the structure of the LED driver circuit.

SUMMARY

A switching current regulator controls a load current flowing through a load. The switching current regulator switches a switch to an ON state after applying a regulating signal to the switch. During an integration period while the switch is in the ON state, the switching current regulator integrates an output voltage based on a sense voltage based on the load current and a reference voltage; at the end of the integration period, the switching current regulator outputs an integrated output voltage. The switching current regulator compares the integrated output voltage to a predetermined value. Based on a result of comparing the integrated output voltage and the predetermined value, the switching current regulator adjusts the regulating signal.

Particular implementations of the switching current regulator can provide one or more of the following advantages: 1) the switching current regulator performs accurate measurement of average current through the load; 2) by using a low side sense configuration during the ON state of the switching current regulator, the number of high voltage transistors can be reduced, thereby reducing cost; 3) the switching current regulator can be integrated with current measurement circuitry with low voltage integrated circuit (IC) technologies and even with a processor on the same chip; 4) the switching current regulator can provide improved control of the load current by directly determining the duty cycle of a regulating signal; and 5) the switching current regulator can be used in a variety of systems, e.g., for dimming an LEDs' brightness, where fast regulator startup is required, and in systems with a sleep mode.

The details of one or more disclosed implementations are set forth in the accompanying drawings and the description below. Other features, aspects, and advantages will become apparent from the description, the drawings and the claims.

DETAILED DESCRIPTION

System Overview

Figure 1:
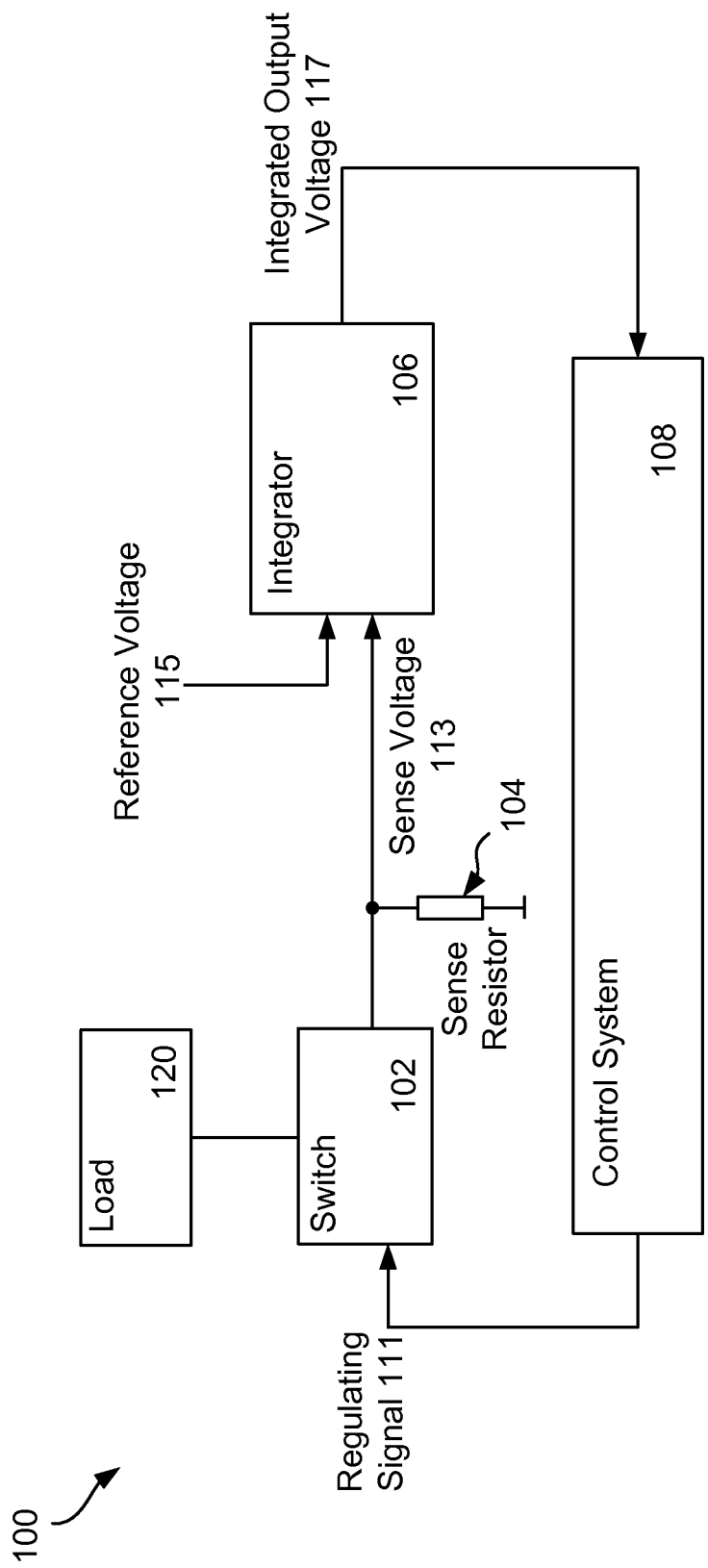
FIG. 1 is an example block diagram of a switching current regulator.

FIG. 1 is an example block diagram of a switching current regulator 100 for controlling a load current flowing through an external load 120 (e.g., an inductive load). The switching current regulator 100 comprises a switch 102, a sense resistor 104, an integrator 106, and a control system 108. The switching current regulator 100 operates in low side mode, where the low side switch 102 is coupled to the load 120 and the low side sense resistor 104. The sense resistor 104 can be grounded.

The switch 102 receives a regulating signal 111 from the control system 108. The regulating signal switches the switch 102 to an ON/OFF state that turns on/off the load 120. When the switch 102 is switched to the ON state, the sense resistor 104 will carry a sense current that is based on the load current. Therefore, the load current can be monitored by measuring the sense current through the sense resistor or a sense voltage over the sense resistor.

In some implementations, switching current regulators are configured in low side mode because low side mode requires fewer components and is easier to operate than high side mode. Low side switching current regulators can be useful to develop low cost switching current regulators for measuring average current through loads such as LEDs. However, accurate measurement of average current through LEDs can be challenging. Due to structures of LED driver circuits, it can be difficult for low side switching current regulators to get current information in a complete switching cycle, and only the current through the LED and the low side switching current regulator during an ON state of the switching current regulator can be obtained.

To control the actual load current through the load to match a target current, the switching current regulator 100 receives a reference voltage 115 based on the target current. The integrator 106 comprises two inputs and one output, where the first input receives the sense voltage 113 and the second input receives the reference voltage 115. The switching current regulator 100 configures the integrator 106 to integrate an output voltage based on the sense voltage 113 and the reference voltage 115 during an integration period and output an integrated output voltage 117 at the end of the integration period. The integration period begins when the switch is switched to the ON state and ends when the switch is switched to the OFF state.

The control system 108 receives the integrated output voltage 117 and compares it to a predetermined value. Based on a result of comparing the integrated output voltage and the predetermined value, the control system can determine a relationship between the sense voltage 113 and the reference voltage 115, so as the relationship between the average load current through the load and the target current. Based on the relationship, the control system 108 adjusts the regulating signal 111 and transmits the adjusted regulating signal to the switch 102. Since the switching current regulator 100 is a loop system with feedback, eventually, it can adjust the average load current to the target current.

Example Switching Current Regulator

Figure 2:
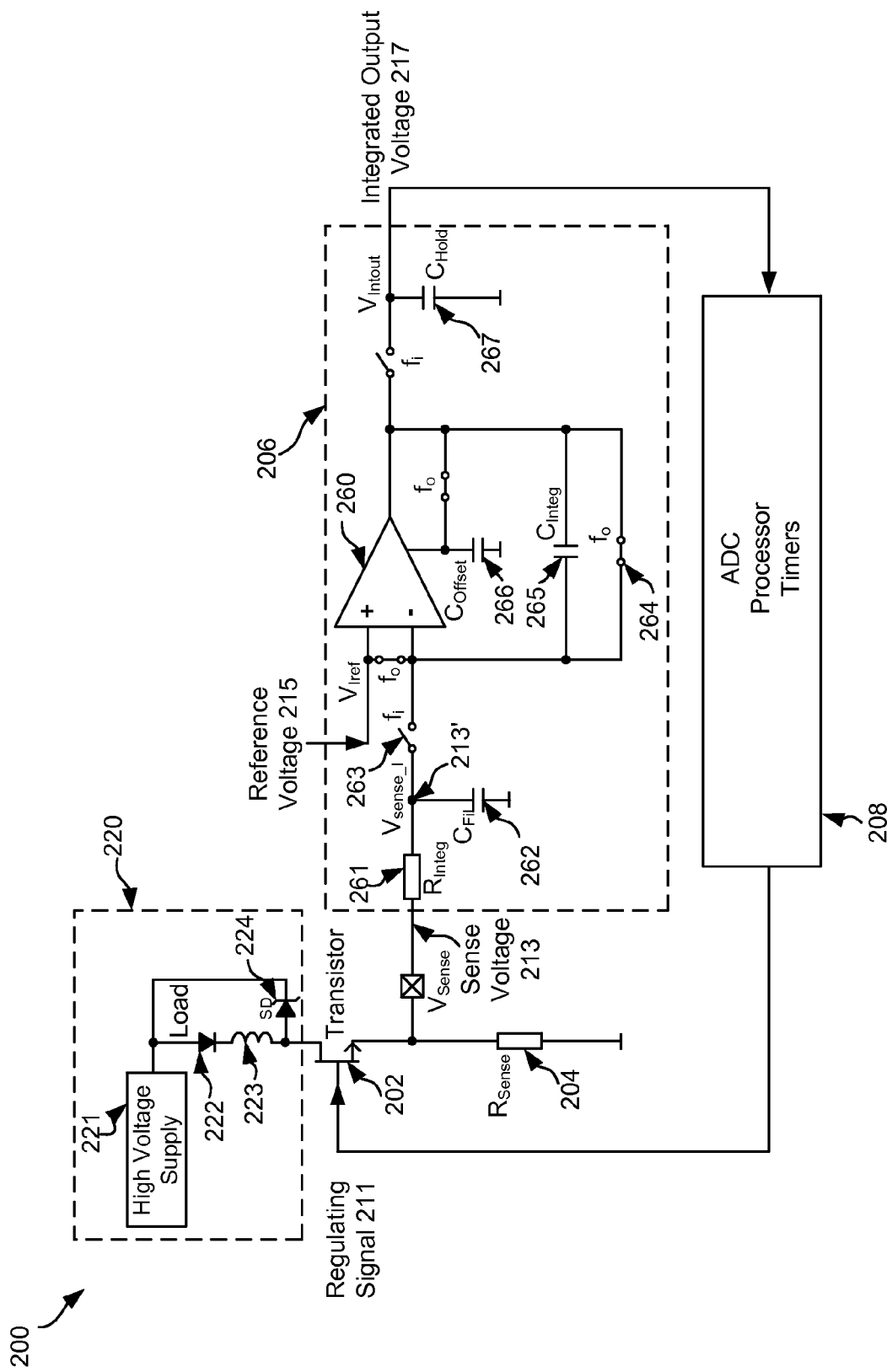
FIG. 2 is a diagram of an example switching current regulator.

FIG. 2 is a diagram of an example switching current regulator 200. The switching current regulator 200 is configured to regulate a load current flowing through a load system 220. The load system can be, for example, a LED system. The load system is configured to be driven in low side mode, where a load (e.g., LED) 222 is coupled between a high voltage supply 221 and an inductor 223 and a switch 202 is coupled between the inductor 223 and a sense resistor 204. The sense resistor 204 can be grounded. The load system 220 can further comprise a diode 224, e.g., a silicon diode (SD), coupled between one side of the load and the high voltage supply.

In some implementations, the switch 202 is a transistor (e.g., nMOS transistor or bipolar transistor) that comprises a base (e.g., a base or a gate) receiving a regulating signal 211 from the control system 208, a collector (e.g., a collector or a drain) connected to the load system 220, and an emitter (e.g., an emitter or a source) connected to the sense resistor 204.

To turn on the transistor, the transistor can be forward biased, i.e., that the voltage between the base and the emitter $V_{BE}$ is larger than a threshold voltage of the transistor. Therefore, the regulating signal 211 can turn the transistor "ON" or "OFF" by controlling $V_{BE}$. The regulating signal can be a current signal (e.g., for bipolar transistors) or a voltage signal (e.g., for field-effect transistors). For example, a regulating signal (e.g., 311 in FIG. 3) with a higher voltage $V_{High}$ state and a lower voltage $V_{Low}$ state in a duty cycle can be used to control the ON/OFF state of the transistor.

When the transistor is in the ON state, current can flow into the collector (and out of the emitter) in proportion to a current flowing into the base:

$$I_C = \beta I_B \quad (1),$$

where $I_B$ and $I_C$ are the currents flowing into the base and the collector, respectively, and $\beta$ is the current gain. Typically $\beta \approx 100$. From Kirchoff's first law and Equation (1), the following relationship among the currents can be obtained:

$$I_E = I_B + I_C = (\beta+1)I_B \approx I_C \quad (2),$$

where $I_E$ is the current flowing into the emitter. Because $\beta \gg 1$, the transistor can be used to control a large current $I_C \approx I_E$ with a small current $I_B$. When the transistor is in the OFF state, no current flows in or out of the transistor: $I_C = \beta I_B = 0$.

Since the sense resistor 204 is coupled to the emitter of the transistor 202 and the load system 220 is coupled to the collector of the transistor, the relationship between the sense current $I_{Sense}$ and the load current $I_{Load}$ can be obtained:

$$I_{Sense} = I_E \approx I_C = I_{Load} \quad (3).$$

Therefore, the load current $I_{Load}$ is substantially identical to the sense current $I_{Sense}$ and can be monitored by measuring the sense current $I_{Sense}$ through the sense resistor or the sense voltage $V_{Sense}$ over the sense resistor with a resistance of $R_{Sense}$. The sense voltage can be expressed as:

$$V_{Sense} = I_{Sense} * R_{Sense} \approx I_{Load} * R_{Sense} \quad (4).$$

The switching current regulator 200 further comprises an integrator 206 that is configured to determine a relationship between the sense voltage $V_{Sense}$ 213 and a reference voltage $V_{Iref}$ 215 during an integration period. The reference voltage can be represented as:

$$V_{Iref} = I_{Target} * R_{Sense} \quad (5),$$

where $I_{Target}$ is a target current (i.e., a desired average current flowing through the load).

In some implementations, the integrator 206 comprises an amplifier 260 (e.g., operating amplifier (OA) or operational transconductance amplifier (OTA)). The amplifier 260 comprises two inputs and one output. The sense voltage 213 is coupled to the first input and the reference voltage 215 is input to the second input. The amplifier 260 outputs an integrated output voltage 217.

The integrator 206 further comprises an integration resistor 261 with a resistance of $R_{Integ}$, a filtering capacitor 262 with the capacitance of $C_{Fil}$, an integration capacitor 265 with a capacitance of $C_{Integ}$, a hold capacitor 267 with a capacitance of $C_{Hold}$, and switches. On the other side of the integration resistor 261, the sense voltage 213 becomes a modified sense voltage 213' that is input to the amplifier 260. The integration resistor 261 and the filtering capacitor 262 can form a low pass filter to reduce noise on the modified sense voltage 213'. In some examples, the product of $R_{Integ}$ and $C_{Fil}$ is substantially smaller than a value of the integration period of the integrator (e.g., the time from $t_1$ to $t_2$ in FIG. 3).

In some implementations, the integrator 206 comprises a first set of switches $f_i$ 263 and a second set of switches $f_o$ 264. The integrator is configured to be in an ON state while the first set of switches 263 are closed and the second set of switches 264 are open and to be in an OFF state while the first set of switches 263 are open and the second set of switches 264 are closed.

Figure 3:
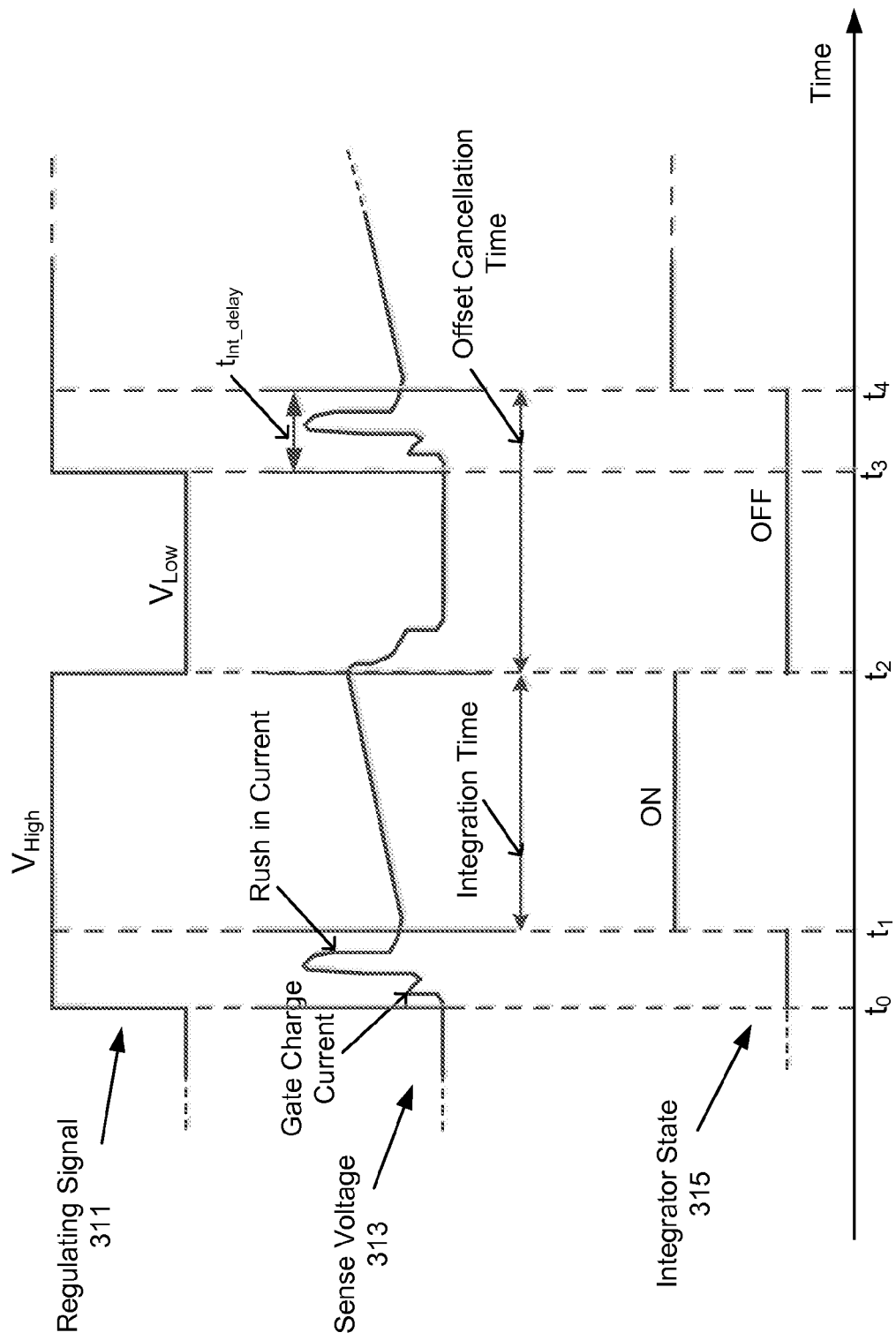
FIG. 3 is an example timing diagram of a switching current regulator.

In some implementations, after the regulating signal 211 switches the switch 202 to the ON state, a gate change current or/and a rush in current of the switching current regulator 200 can distort the sense current and thus the sense voltage (e.g., 313 in FIG. 3). An integration delay $t_{Int\_delay}$ can be used to act as a blanking time interval to prevent deviations in current or voltage measurement.

The integrator 206 can be configured to receive a switching command for switching the integrator to the ON state following the integration delay after the switch 202 is switched to the ON state and to the OFF state when the switch 202 is switched to the OFF state. The integrator 206 can be also configured to begin the integration period when the integrator is switched to the ON state and end the integration period when the integrator is switched to the OFF state.

Example Timing Diagram

FIG. 3 is an example timing diagram illustrating a regulating signal 311, a sense voltage 313 and an integrator state 315. The regulating signal 311 has a periodical duty cycle: from $t_0$ to $t_2$, it has a higher voltage $V_{High}$ that switches a switch to an ON state; from $t_2$ to $t_4$, it has a lower voltage $V_{Low}$ that switches the switch to an OFF state.

The time period from $t_0$ to $t_1$ (or from $t_3$ to $t_4$) is the integration delay period. Therefore, the time period from $t_1$ to $t_2$, is an integration period with the integrator state 315 being ON; the time period from $t_2$ to $t_4$, is an offset cancellation period with the integrator state 315 being OFF. A duty cycle of the integrator includes both the integration period and the offset cancellation period. The regulating signal and the integrator can have a same switching frequency.

The integration delay can be determined to be a constant delay that depends on circuit characteristics of the switching current regulator. The integration delay also can be determined by a current measurement. After switching the transistor to the ON state, a current measurement system measures the sense current flowing through the sense resistor, and a comparator compares a predetermined current to the measured sense current. When the measured sense current matches the predetermined current, the integration delay ends and the integration period starts.

After the integration period (e.g., from $t_1$ to $t_2$) of the integrator, the integrator outputs an integrated output voltage $V_{Intout}$ that can be expressed as:

$$V_{Intout} = \frac{\int_{t_1}^{t_2}(V_{Iref} - V_{Sense}(t))dt}{R_{Integ}C_{Integ}} = \frac{\int_{t_1}^{t_2}(V_{Iref} - I_{Sense}(t)R_{Sense})dt}{R_{Integ}C_{Integ}} \approx \frac{\int_{t_1}^{t_2}(V_{Iref} - I_{load}(t)R_{Sense})dt}{R_{Integ}C_{Integ}} = \frac{(t_2 - t_1)}{R_{Integ}C_{Integ}}(I_{Target} - I_{Average})R_{Sense} \quad (6)$$

where $I_{Average}$ is the average load current flowing through the load.

The integrator 206 further comprises an offset cancellation circuit that comprises an offset capacitor 266 with a capacitance of $C_{Offset}$. During the offset cancellation period, the offset cancellation circuit resets the integrator 206 to a default condition. For example, the output voltage at the voltage output of the integrator can be reset to zero.

In some implementations, the switching current regulator 200 includes an additional buffer that transfers the integrated output voltage to the control system 208. The switching current regulator 200 further includes a separate amplifier (e.g., OTA) coupled to the integrator 206 for offset cancellation that compensates the offset of the separate amplifier, the integrator's offset, and the buffer's offset sequentially.

After receiving the integrated output voltage 217, the control system 208 compares the integrated output voltage $V_{Intout}$ to a predetermined value and then adjusts the regulating signal 211 based on a result of comparing the integrated output voltage and the predetermined value.

In some implementations, the control system 208 comprises an analog-to-digital converter (ADC) and a processor. The ADC converts an analog signal of the integrated output voltage to a digital signal. The processor compares the digital signal with a digital voltage value of the predetermined value and adjusts the regulating signal based on the compared result. The control system 208 further transmits the adjusted regulating signal to the switch 202.

In some implementations, the predetermined value is predetermined to be zero. The processor compares the integrated output voltage $V_{Intout}$ (shown in Equation (6)) to zero. Consider three possible scenarios.

I. If $V_{Intout}>0$, then $I_{Average}<I_{Target}$. The average load current is lower than the target current. In other words, the average of the sense voltage $V_{Sense}<V_{Iref}$. Thus the duty cycle value of the regulating signal will be increased;

II. If $V_{Intout}<0$, then $I_{Average}>I_{Target}$. The average load current is higher than the target current. In other words, the average of the sense voltage $V_{Sense}>V_{Iref}$. Thus the duty cycle value of the regulating signal will be decreased;

III. If $V_{Intout}=0$, then $I_{Average}=I_{Target}$. The average load current matches the target current. In other words, the average of the sense voltage $V_{Sense}=V_{Iref}$. Thus the duty cycle value of the regulating signal remains the same.

In some implementations, the control system 208 further comprises a timer. The timer sets a duty cycle of the regulating signal 211. The duty cycle of the regulating signal has a switching frequency. Since the integrator 206 has a same switching frequency as the regulating signal 211, the switching frequency of the regulating signal 211 will be the switching frequency of the switching current regulator 200. The switching frequency of the switching current regulator can be 2 MHz.

In operation, the control system 208 can transmit a switching command to the integrator 206 to control the open/closed states of the first set of switches and the second set of switches of the integrator with the same switching frequency as the switching current regulator.

Example Multi-Channel Load Driver System

Figure 4:
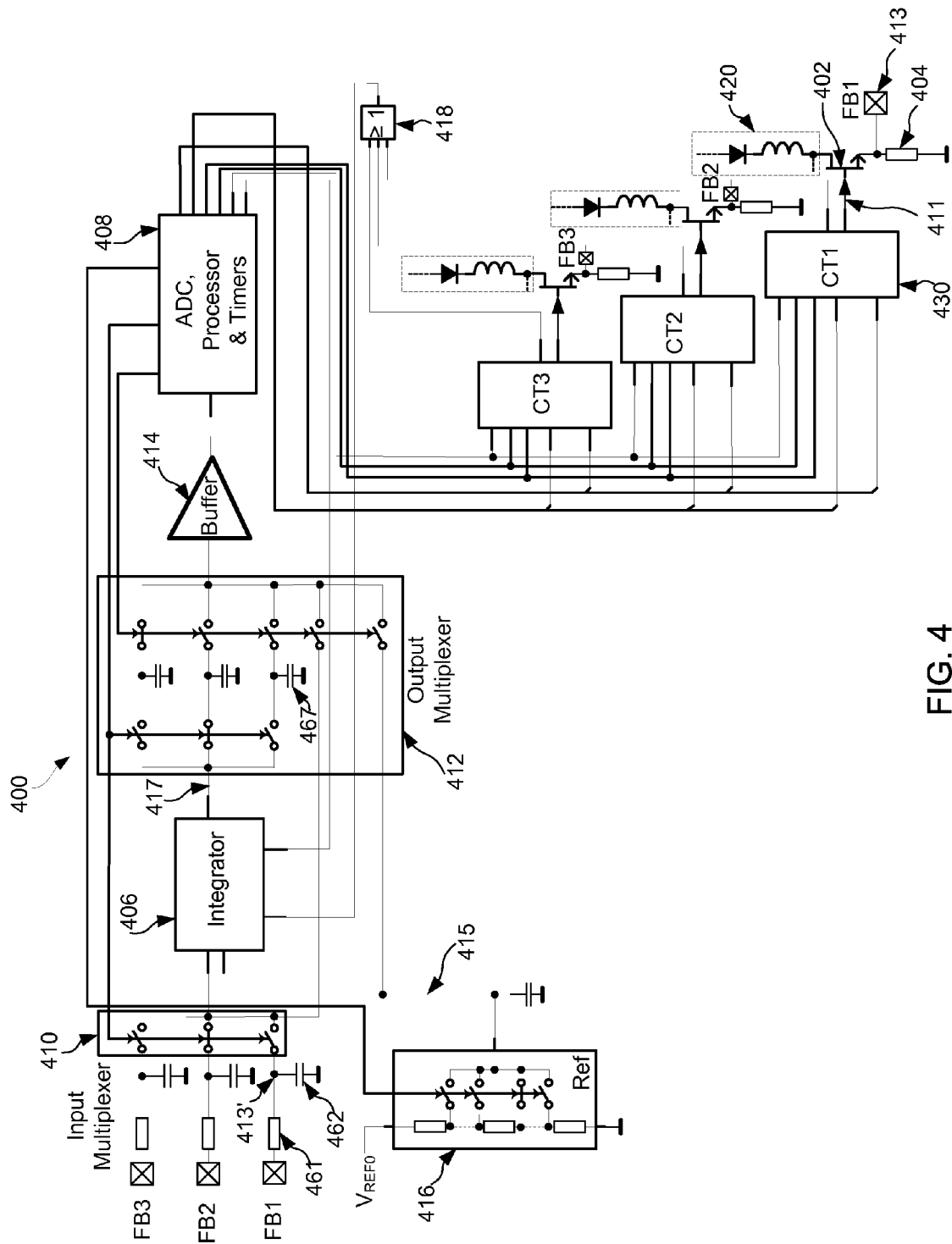
FIG. 4 is a diagram of an example multi-channel load driver system.

FIG. 4 is a diagram of an example multi-channel load driver system 400. The multi-channel load driver system is configured to drive a plurality of load systems and to individually regulate current flowing through each load in the multiple channels. The load systems can be, for example, LED systems. The number of the multiple channels can be any integer larger than zero. A three-channel load driver system, for example, is illustrated in FIG. 4.

Each channel of the multi-channel load driver system 400 individually comprises a switch 402, a sense resistor 404, and a load system 420. In some implementations, each channel further comprises a channel timer 430, an integration resistor 461, and a filtering capacitor 462. Each channel of the multi-channel load driver system 400 comprises an integrator 406, a control system 408, an input multiplexer 410, and an output multiplexer 412. Each channel of the multi-channel load driver system 400 can also include a buffer 414, a reference voltage circuit 416, and a comparator 418. The characteristics of the load system 420, the switch 402, the sense resistor 404, the integrator 406, and the control system 408, can be substantially the same as those of the switching current regulator 200 of FIG. 2.

In some implementations, the control system 408 comprises an analog-to-digital converter (ADC) multiplexer, a processor, and a plurality of timers. The control system 408 can further comprise a firmware. The firmware is stored in a flash inside the control system. The firmware stores a series of commands for operating the multi-channel load driver system. For example, the commands stored in the firmware can be based on specific requirements on the multi-channel load driver system.

The control system 420 is further configured to determine a working channel at a certain time interval and transmit an integration command to the input multiplexer 410 and the output multiplexer 412 to choose the same working channel. At a time interval, only one channel is chosen as the working channel in the multi-channel load driver system.

In some implementations, the input multiplexer 410 comprises a plurality of input switches, each of which is coupled between the sense resistor 404 and the integrator 406 in each channel. The input multiplexer 410 receives the integration command and closes the corresponding input switch of the working channel.

In some implementations, the output multiplexer 412 comprises a plurality of output switches coupled to the integrator 406. The output multiplexer receives the integration command and closes the corresponding output switch of the working channel.

In some implementations, the output multiplexer 412 further comprises a plurality of buffer switches coupled to the buffer 414. One buffer switch is coupled to the reference voltage circuit 416 to receive a reference voltage 415 of the working channel, another buffer switch is coupled to the input multiplexer 410 to receive a sense voltage 413' of the working channel coupled to the integrator 406, and the other buffer switches are correspondingly coupled to the plurality of output switches. In some examples, the number of the multi-channel load driver system is three, and the number of the plurality of buffer switches is five.

At a certain time, the control system 420 chooses a buffer voltage from the reference voltage 415, the sense voltage 413' of the working channel, and an integrated output voltage 417 of the working channel. Then the control system 420 transmits a sample control command to the output multiplexer 412. After receiving the sample control command, the output multiplexer 412 will close the buffer switch corresponding to the chosen buffer voltage and output the chosen buffer voltage to the buffer 414.

In some implementations, the output multiplexer includes a hold capacitor 467 in each channel of the multi-channel load driver system 400. A first pin of the hold capacitor 467 is connected between the output switch and the buffer switch in each channel of the multi-channel load driver system 400, and a second pin of the hold capacitor 467 is coupled to the ground.

In some implementations, the control system 420 can choose different reference voltages for different channels of the multi-channel load driver system 400. When the control system 420 chooses the working channel, the control system 420 will choose a reference voltage corresponding to the working channel and transmit a reference trim command to the reference voltage circuit 416.

In some implementations, the reference voltage circuit 416 is a voltage divider. The reference voltage circuit 416 comprises a series of resistors and a plurality of resistor switches. After receiving the reference trim command, the reference voltage circuit 416 will close the corresponding resistor switch and output the reference voltage 415 to both the integrator 406 and the output multiplexer 412. In some implementations, the reference voltage circuit 416 is a digital to analog converter (DAC). The reference voltage circuit 416 can receive a digital signal of the reference voltage chosen by the control system 420 and convert the digital signal to an analog signal for the reference voltage.

In some implementations, when the control system 420 chooses the working channel, the control system 420 also chooses a working channel timer of the working channel and transmits a start command and a load command to the working channel timer. The control system 420 can also set a working frequency of the working channel timer. In some examples, the working frequency can be 400 MHz.

In some implementations, the control system 420 can determine a switching frequency of the regulating signal 411 and transmit a frequency command to the integrator 406. The integrator can have a same switching frequency as the regulating signal. In some examples, the switching frequency can be 2 MHz.

In some implementations, a regulating signal 411 resembles the regulating signal 311 illustrated in FIG. 3. The control system 420 can determine a duty cycle value of the regulating signal 411 and transmit the duty cycle value to the working channel timer.

In some implementations, the channel timers are running autonomously and are preloaded with the duty cycle value. After comparing a measured average load current to a target current of the working channel, the control system 420 calculates a new duty cycle value for correction based on the compared result. Then the control system transfers the new duty cycle value to the working channel timer, and the working channel timer outputs a new regulating signal based on the new duty cycle value to the switch. When the control system switches off the channel timer, the used duty cycle value can be stored and be used as a start value in restart when the channel timer is switched on and becomes the working channel timer again.

In some implementations, each channel timer of the plurality of channel timers is coupled between the control system 408 and the switch 402. Each channel timer can include an integrate pin coupled to the comparator 418. The comparator 418 can be further coupled to the integrator 406. In some implementations, the comparator 418 can be integrated in the control system 408; in some other implementations, the comparator 418 can be integrated in the integrator 406.

The integrate pin of the channel timer outputs a pin value. All the channel timers except the working channel timer have a default pin value. After receiving the start command and the load command, the working channel timer resets the integrate pin value to a new pin value, and the comparator 418 compares the pin values from all the channel timers to a predetermined value under a criterion.

For example, the default pin value is zero, the predetermined value is one, the new pin value is one, and the criterion is that the pin value is not smaller than the predetermined value. Therefore, only the working channel timer is satisfied with the criterion. The working channel timer will transmit a switching command to the integrator 406. After receiving the switching command, the integrator 406 starts working.

In some implementations, the switching command switches the integrator 406 to be in an ON state during an integration period and in an OFF state during an offset cancellation period. In some implementations, the control system 420 can determine an integration delay for the integrator 406 and transmit the integration delay information to the working channel timer.

The working channel timer receives the integration delay information and transmits the switching command to the integrator following the integration delay after the regulating signal 411. Therefore, the switching command switches the integrator 406 to the ON state following the integration delay after the regulating signal 411 switches the switch 402 to an ON state. The switching command switches the integrator 406 to the OFF state when the regulating signal 411 switches the switch 402 to an OFF state.

In some examples, the regulating signal 411 resembles the regulating signal 311 in FIG. 3 and the integrator 406 has an integrator state that resembles the integrator state 315 shown in FIG. 3.

In operation, the multi-channel load driver system 400 works as follows. First, at a time interval, the control system 408 chooses a working channel and transmits an integrate control command to the input multiplexer 410 and the output multiplexer 412 for closing the corresponding input switch and output switch for the working channel. The control system also transmits a start command and a load command to the plurality of channel timers for starting a working channel timer and a reference trim command to the reference voltage circuit 416 for choosing a reference voltage 415 corresponding to the working channel.

The control system 408 determines a duty cycle value of the regulating signal and transmits the duty cycle value to the working channel timer. The control system 408 determines an integration delay for the integrator 406 and transmits the integration delay information to the working channel timer. The control system 408 sets a working frequency of the working channel timer 430 and a switching frequency of the integrator 406.

Second, the working channel timer 430 outputs a regulating signal 411 based on the duty cycle value to the switch 402. The switch 402 starts controlling the load system of the working channel. The switch 402 outputs a sense voltage 413 that becomes a modified sense voltage 413' after the integration resistor 461. The working channel timer 430 receives the integration delay information and transmits a switching command to the integrator 406.

Third, the integrator 406 receives the sense voltage 413' of the working channel at a first input and the reference voltage 415 of the working channel at a second input. The integrator 406 integrates an output voltage that is based on the sense voltage 413' and the reference voltage 415 based on a target current during an integration period, and outputs an integrated output voltage 417 at the end of the integration period. The switching current regulator 400 resets the integrator 406 during an offset cancellation period.

Fourth, at a certain time, the output multiplexer 412 receives a sample control command from the control system 408, closes a buffer switch corresponding to the chosen buffer voltage and outputs the chosen buffer voltage to the buffer 414.

Fifth, at a certain time, the buffer 414 transfers all buffer voltages to the control system 408. The ADC multiplexer of the control system converts analogic signals of the buffer voltages to digital signals. The processor of the control system compares the digital signal of the integrated output voltage of the working channel to a digital voltage value of a predetermined value. In some examples, the predetermined value is zero. The processor of the control system 408 functions substantially same as the processor of the control system 208.

Based on the compared result, the processor calculates a new duty cycle value for the regulating signal. The control system 408 transmits the new duty cycle value to the working channel timer and starts a new regulating cycle. Eventually, the average current through the load of the working channel during the integration period will match the target current.

At another time interval, the control system 408 switches off the working channel and chooses a new working channel to start a new regulating cycle for the new working channel. In some implementations, as the switching frequency of the regulating signal can be 2 MHz, the multi-channel load driver system can work as a fast switching current regulator for multiple loads. For example, the multi-channel load driver system can sequentially flash a series of LEDs with a high frequency.

Example Flowchart

Figure 5:
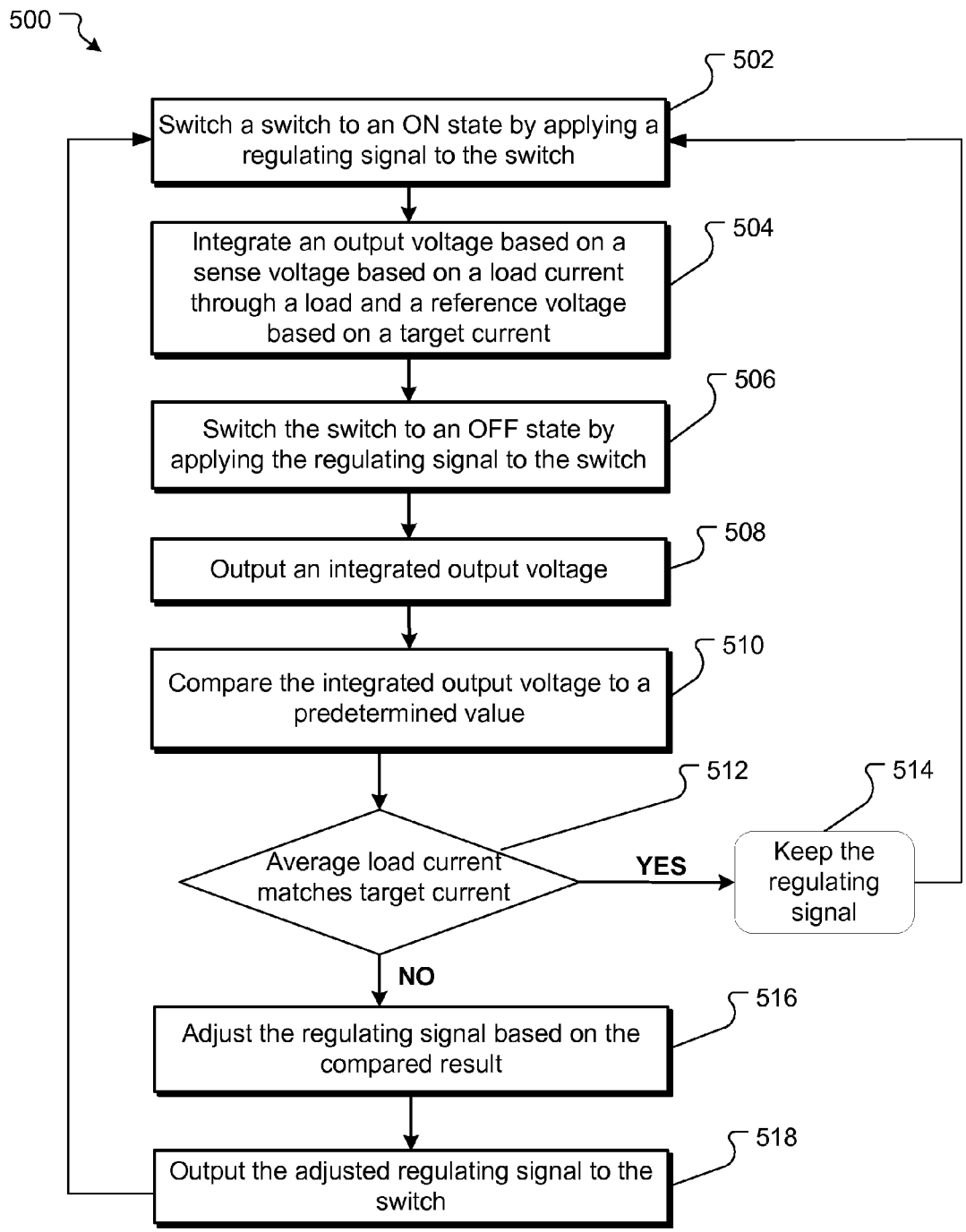
FIG. 5 is a flow diagram of an example process performed by a switching current regulator.

FIG. 5 is a flow diagram of an example process 500 performed by a switching current regulator. The switching current regulator can be the switching current regulator 200 of FIG. 2 or the switching current regulator of the multi-channel load driver system 400 of FIG. 4.

The switching current regulator configures a switch to receive a regulating signal. The regulating signal switches the switch to an ON state that turns on a load coupled to the switch (502).

The switching current regulator includes a sense resistor coupled to the switch, and the sense resistor carries a sense current that is based on a load current flowing through the load. The switching current regulator configures an integrator to integrate an output voltage based on a sense voltage over the sense resistor and a reference voltage based on a target current during an integration period while the switch is in the ON state (504).

The switching current regulator configures the regulating signal to switch the switch to an OFF state that ends the integration period (506). The switching current regulator configures the integrator to output an integrated output voltage at the end of the integration period (508).

The switching current regulator configures a control system to compare the integrated output voltage to a predetermined value (510). The predetermined value is predetermined by the control system. In some examples, the predetermined value is zero.

Based on a result of comparing the integrated output voltage and the predetermined value, the control system determines a relationship between the average sense voltage during the integration period and the reference voltage, so as the relationship between the average load current during the integration period and the target current (512).

If the average load current matches the target current, the switching current regulator keeps the duty cycle of the regulating signal (514), applies the same regulating signal to the switch and starts a new cycle to continue monitoring the load current through the load.

If the average load current does not match the target current, the switching current regulator will adjust the regulating signal (516) so that the average load current during the integration period can match the target current in the next regulating cycle. The switching current regulator then outputs the adjusted regulating signal to the switch (518) and starts the new regulating cycle.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:
1. A switching current regulator comprising:
a switch for receiving a regulating signal for switching the switch to an ON/OFF state for turning on/off a load, wherein the load is a light emitting device (LED), the LED being coupled between a power supply and an inductor coupled to the switch;
a sense resistor coupled to the switch, wherein the sense resistor is configured to carry a sense current based on a load current flowing through the load;

an integrator coupled to the switch, wherein the integrator is configured to perform integrator operations comprising:

integrating an output voltage based on a sense voltage over the sense resistor input to a first input of the integrator and a reference voltage input to a second input of the integrator during an integration period while the switch is in the ON state; and outputting an integrated output voltage at the end of the integration period; and a control system coupled to the integrator and the switch, wherein the control system is configured to perform control operations comprising:

comparing the integrated output voltage to a predetermined value; and adjusting the regulating signal based on a result of comparing the integrated output voltage and the predetermined value.

2. The switching current regulator of claim 1, wherein the integrator is configured to:

receive a switching command for switching the integrator to an ON state following an integration delay after the switch is switched to an ON state; and receive the switching command for switching the integrator to an OFF state following the integration delay after the switch is switched to an OFF state.

3. The switching current regulator of claim 2, wherein the integrator comprises a first set of switches and a second set of switches, and wherein the integrator is configured to be in the ON state while the first set of switches are closed and the second set of switches are open and to be in the OFF state while the first set of switches are open and the second set of switches are closed.

4. The switching current regulator of claim 2, wherein the integrator is configured to begin the integration period when the integrator is switched to the ON state and end the integration period when the integrator is switched to the OFF state.

5. The switching current regulator of claim 2, wherein the integrator is configured to begin the integration delay when the switch is switched to the ON state and end the integration delay when a sense current flowing through the sense resistor measured by a current measurement system matches an expected current.

6. The switching current regulator of claim 2, wherein the integrator comprises an offset cancellation circuit configured to reset the integrator during an offset cancellation period while the integrator is in the OFF state.

7. The switching current regulator of claim 2, the integrator further comprising:

a buffer configured to transfer the integrated output voltage to the control system; and an amplifier configured to reset the integrator during an offset cancellation period while the integrator is in the OFF state.

8. The switching current regulator of claim 1, wherein the switch is a transistor, the transistor comprising a base for receiving the regulating signal, a collector coupled to the load, and an emitter coupled to the sense resistor.

9. The switching current regulator of claim 1, wherein the control system comprises:

an analog-to-digital converter (ADC) for converting an analog signal of the integrated output voltage to a digital signal;

a processor for comparing the digital signal with a digital voltage value of the predetermined value and adjusting the regulating signal based on a result of comparing the digital signal and the digital voltage value; and a timer for setting a switching frequency of the regulating signal.

10. The switching current regulator of claim 9, wherein adjusting the regulating signal comprises adjusting the regulating signal so that the regulating signal has a duty cycle that will be changed when the digital signal is not equal to the digital voltage value and remain the same when the digital signal is equal to the digital voltage value.

11. A multi-channel load driver system comprising:

a plurality of load systems;

a plurality of switches, wherein each switch receives a regulating signal for switching the switch to an ON/OFF state for turning on/off one of the plurality of load systems;

a plurality of sense resistors, wherein each sense resistor is coupled to one switch and configured to carry a sense current based on a load current flowing through the load system;

an input multiplexer coupled to the plurality of switches and the plurality of sense resistors for receiving an integrate control command to choose a working channel;

an integrator coupled to the input multiplexer, wherein the integrator is configured to perform integrator operations comprising:

integrating an output voltage based on a sense voltage over the sense resistor of the working channel input to a first input of the integrator and a reference voltage input to a second input of the integrator during an integration period while the switch of the working channel is in the ON state; and outputting an integrated output voltage at the end of the integration period;

an output multiplexer coupled to the integrator for receiving the integrate control command to choose the working channel;

a control system coupled to the input multiplexer, the output multiplexer, and the plurality of switches, wherein the control system is configured to perform control operations comprising:

comparing the integrated output voltage to a predetermined value; and adjusting the regulating signal based on a result of comparing the integrated output voltage and the predetermined value.

12. The multi-channel load driver system of claim 11, wherein the integrator is configured to receive a switching command that switches the integrator to an ON state following an integration delay after the switch of the working channel is switched to an ON state and to an OFF state when the switch of the working channel is switched to an OFF state.

13. The multi-channel load driver system of claim 12, wherein the integration period of the integrator begins when the integrator is switched to the ON state and ends when the integrator is switched to the OFF state.

14. The multi-channel load driver system of claim 12, wherein the control system is further configured to perform operations comprising:

determining the integration delay;

determining a reference voltage for the working channel; and determining a switching frequency of the regulating signal.

15. The multi-channel load driver system of claim 11, further comprising a plurality of channel timers configured to perform operations comprising:

receiving a start command to determine a working channel timer for the working channel;

receiving information of an adjusted regulating signal from the control system;

generating a new regulating signal based on the information; and outputting the new regulating signal to the switch of the working channel.

16. The multi-channel load driver system of claim 11, further comprising a reference voltage circuit configured to output different reference voltages for different channels of the multi-channel load driver system.

17. The multi-channel load driver system of claim 11, wherein the output multiplexer is further configured to receive a sample control command to choose a buffer voltage from the integrated output voltage, the sense voltage of the working channel, and the reference voltage of the working channel.

18. The multi-channel load driver system of claim 17, further comprising a buffer coupled to the output multiplexer, the buffer for transferring the buffer voltage to the control system.

19. A method performed by a switching current regulator, the method comprising:

switching a switch to an ON state by applying a regulating signal to the switch;

integrating an output voltage based on a sense voltage based on a load current through a load and a reference voltage during an integration period while the switch is in the ON state, wherein the load is a light emitting device (LED), the LED being coupled between a power supply and an inductor coupled to the switch;

outputting an integrated output voltage at the end of the integration period;

comparing the integrated output voltage to a predetermined value; and adjusting the regulating signal based on a result of comparing the integrated output voltage and the predetermined value.

* * * * *